Oct. 9, 1956  R. N. HARTZELL ET AL  2,765,859
FAN
Original Filed July 30, 1953  2 Sheets-Sheet 1
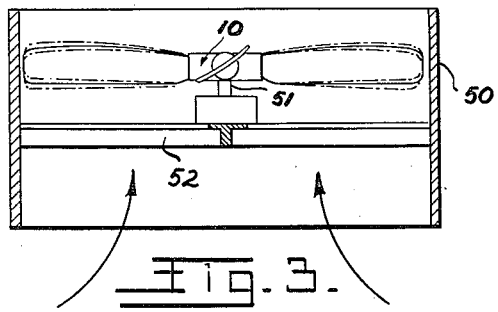
Fig. 3.
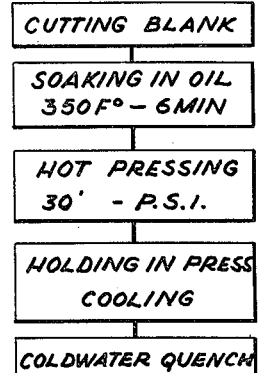
Fig. 13.
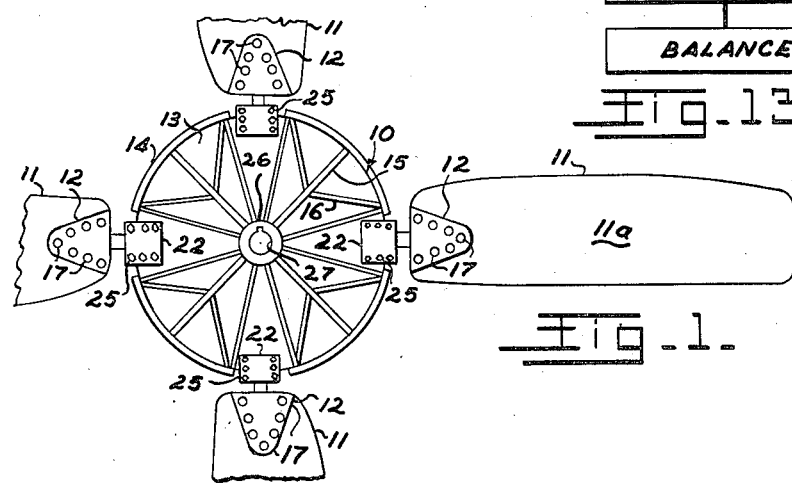
Fig. 1.
Fig. 2.
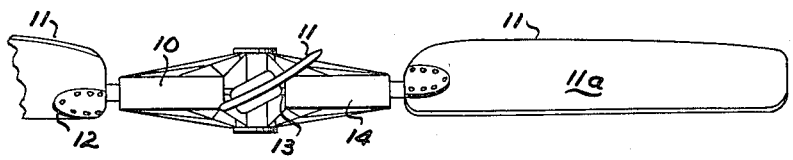
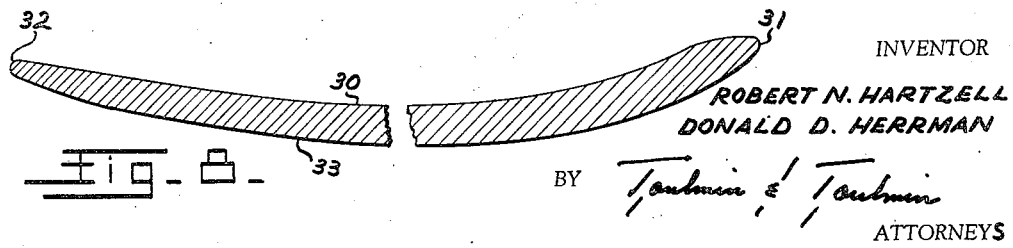
Fig. 8.
INVENTOR
ROBERT N. HARTZELL
DONALD D. HERRMAN
BY Toulmin & Toulmin
ATTORNEYS Oct. 9, 1956  R. N. HARTZELL ET AL  2,765,859
FAN
Original Filed July 30, 1953  2 Sheets—Sheet 2
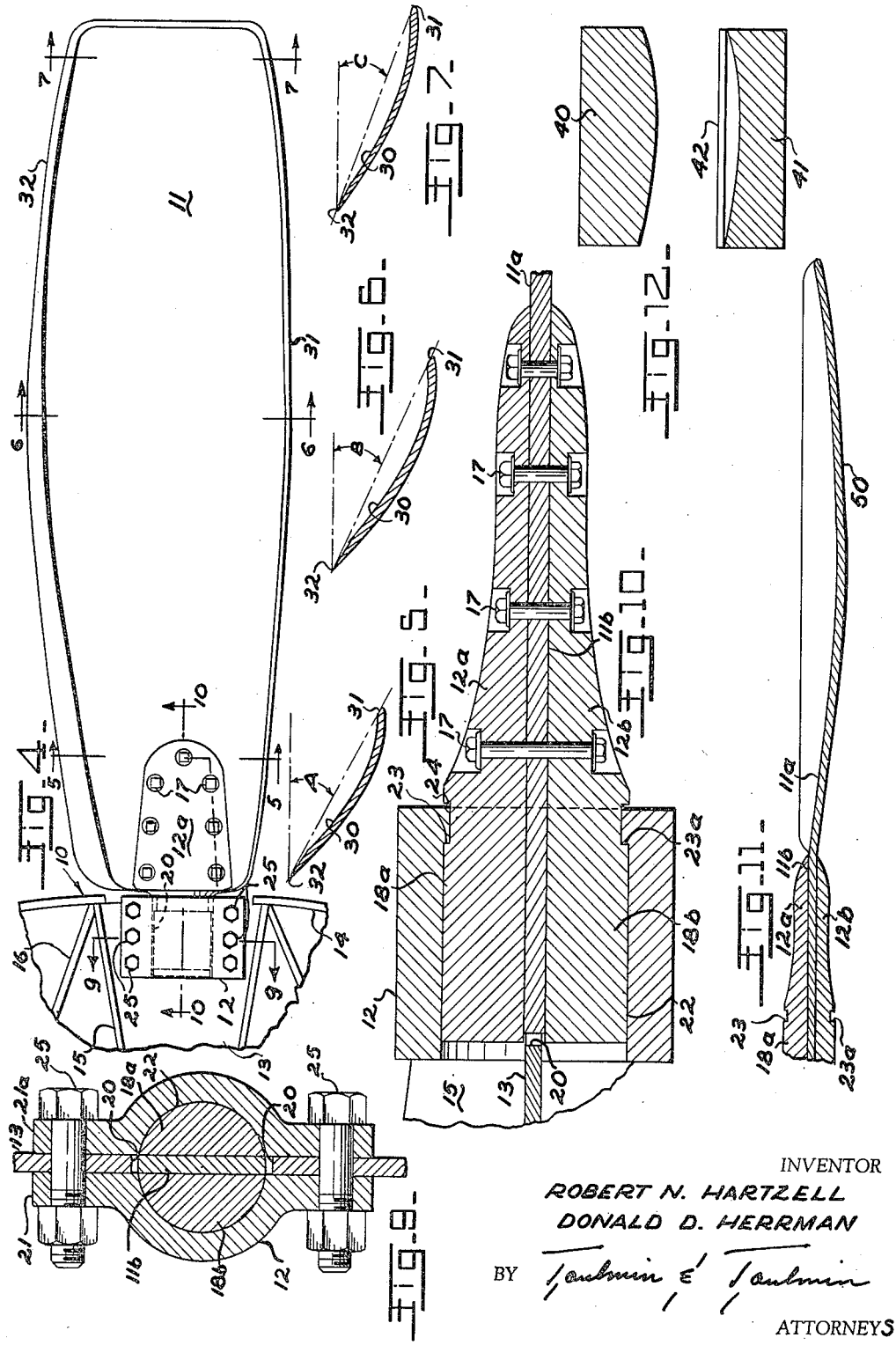
INVENTOR
ROBERT N. HARTZELL
DONALD D. HERRMAN
BY Toulmin & Toulmin
ATTORNEYS United States Patent Office 2,765,859
Patented Oct. 9, 1956

2,765,859

FAN

Robert N. Hartzell and Donald D. Herrman, Piqua, Ohio, assignors to Hartzell Propeller Fan Co., Piqua, Ohio, a corporation of Ohio Application September 15, 1954, Serial No. 456,232

1 Claim. (Cl. 170—160.6)

This invention relates to the forming of sheet materials commonly known as thermosetting materials, and which, in the state generally designated as fully cured, have been considered as being non-formable. More specifically, the invention relates to the forming or shaping of sheet materials of the thermosetting type into a fan blade.

This application is a division of my co-pending application, Serial No. 371,227, filed July 30, 1953, now abandoned.

The thermosettng materials with which this invention is concerned are not to be confused with the thermoplastic group of materials which include cellulose nitrates, cellulose acetates, many vinyl derivatives and others. This invention is concerned with the forming of sheet material of the type that has an absorbent base sheet, for example, paper or fabric, that is impregnated with a thermosetting resin, and a plurality of the so impregnated sheets are bonded together through the medium of the thermosetting resin to form sheet material. The thermosetting resin may be a phenol, urea, molamine formaldehyde resin, or others of this same classification. When these resins are fully cured, the products that are made from them have been considered non-formable.

Sheet materials of the thermosetting class, in what has been commonly considered the fully cured state, have been commonly designated as "C-stage" thermosetting materials. They are commonly produced by polymerization under heat and pressure, the temperature ranging in the neighborhood of 300° F. and the pressure ranging from 250 lbs. per square inch upward to several thousand lbs. per square inch.

In the manufacture of sheet material with which this invention is concerned, a phenol xylenon, for example, is mixed with an aldehyde in the presence of a catalyst and subjected to heat and agitation to produce a viscous liquid resin in what is known as "A" stage.

In preparing the laminated sheets, individual sheets of fabric or paper are impregnated with the "A" stage resin diluted in alcohol and then dried under heat. The resin is partially polymerized to become a "B" stage resin.

The "B" stage impregnated sheets are then assembled in stacks and pressed together at elevated temperature and under pressure to thus product the "C" stage laminated material. Polymerization is accompanied by an exothermic reaction. The curing of the resin is allowed to continue until the exothermic reaction substantially subsides, and at this point the process is stopped, resulting in the generally considered completely cured thermosetting material.

It is generally known that by greatly extending the curing process, a slightly higher stage of curing may be effected, but the degree of cure obtained by the extended curing process has been considered so small in comparison to the result obtained by the additional cure as to be regarded unnecessary, and thus to regard the "C" stage material as being completely cured thermosetting material.

An object of this invention is to provide a process of forming or shaping cured thermosetting sheet material without in any way affecting the strength of the material or inducing forming strains in the material.

A further object of the invention is to provide a process of forming a fan-blade from a sheet of cured thermosetting sheet material and to obtain complete strain relief in the so-formed cured sheet of thermosetting material.

Still another object of the invention is to provide a novel ventilating fan of cured thermosetting sheet material in which the blades of the fan are in effect flexible when still, but which become semi-rigid as the mass of the blade is placed into motion, whereby to permit a floating movement of the blades of the fan to permit the blades to absorb rapidly changing pressures on opposite sides of the blades without causing any flutter of the blades.

A still further object of the invention is to provide a novel construction for attaching blades made according to this invention, to a hub.

A still further object of this invention is to provide a novel blade contour to give quietness of operation without requiring manufacture of highly complicated curvatures on the blade surfaces.

Further objects and advantages will become apparent from the drawings and the following description.

In the drawings:

Figure 1 is a plan view of a ventilating fan constructed according to the teachings of this invention;

Figure 2 is a side elevational view of the ventilating fan illustrated in Figure 1;

Figure 3 is a diagrammatic view illustrating the positioning of the ventilating fan of Figure 1 in a ventilating duct;

Figure 4 is an enlarged plan view of one of the blades of the fan illustrated in Figure 1;

Figures 5, 6 and 7 are cross-sectional views taken along line 5—5, line 6—6 and line 7—7 respectively of Figure 4 illustrating the contour of the blade;

Figure 8 is an enlarged cross-sectional view similar to those of Figures 5, 6 and 7;

Figure 9 is a cross-sectional view taken along line 9—9 of Figure 4;

Figure 10 is a cross-sectional view taken along line 10—10 in Figure 4;

Figure 11 is a longitudinal cross-sectional view illustrating a modified cross-section of the contour of the fan blade;

Figure 12 is a diagrammatic view of a form in which the fan blade can be produced;

Figure 13 is a flow chart illustrating the steps in the method of making a fan blade according to this invention.

In this invention the ventilating fan consists of a hub wheel 10 to which the blades 11 are attached by hub fittings 12 hereinafter described.

The hub wheel 10 consists of a circular plate 13 that is reinforced around its periphery by the rim members 14 on each side of the plate 13 by means of gussets 15 and members 16 extending between the gussets 15 and the rim 14. The members 14, 15 and 16 are secured to the plate 13 by any suitable means such as welding or brazing. The fan blade 11 consists of the blade portion 11a and the hub portion 11b, shown in Figure 10. The hub portion 11b of the blade 11 is retained between the hub fittings 12a and 12b, suitable bolts 17 passing through the hub fittings 12a and 12b and the hub portion 11b of the blade 11 to secure the blade to the hub fittings.

The hub fittings 12a and 12b each have a hub portion.

The hub fittings 12a and 12b have the semi-cylindrical portions 18a and 18b respectively that project from one end of the fittings 12 and the blade 11. It will be noted that the hub portion 11b of the blade extends to between the hub portions 18a and 18b of the hub fittings 12.

The plate 13 has a slot 20, more particularly shown in Figures 9 and 10, cut inwardly from the periphery of the plate 13 to receive the hub portions 18a and 18b of the hub fittings 12.

The caps 21 and 21a are placed on opposite sides of the plate 13, shown in Figure 9, to secure the hub portions 18a and 18b in the bore 22 formed by the cooperating caps 21 and 21a. The caps 21 and 21a each have a shouldered portion 23 and 23a respectively that fits within an annular recess 24 provided in the hub portions 18a and 18b of the hub fittings. Bolts 25 pass through the caps 21 and 21a, and through the plate 13, as shown in Figure 9, to secure the hub fittings 12 to the hub wheel 10, and thereby attach the blades 11 to the hub wheel 10.

The hub wheel 10 has a hub fitting 26 that has an axial bore 27 for mounting of the hub wheel on a suitable driving shaft.

The shoulders 23 and 23a in the caps 21 and 21a absorb the outward radial thrust of the blades 11 during operation of the ventilating fan.

The blade 11 of the ventilating fan is formed from a sheet of "C-stage" thermosetting sheet material, in a manner hereinafter more particularly described. The forward face 30 of the blade is formed with a concave curvature that is somewhat greater toward the leading edge 31 of the blade than toward the trailing edge 32. The rear face 33 of the blade 11 follows the curvature of the forward face 30, thereby giving to the blade a uniform thickness transversely of the blade. The blade is thus constructed from a sheet of "C-stage" thermosetting sheet material of uniform thickness throughout its cross-section, and the curvature imparted to the blade is produced by the process hereinafter set forth.

The concave transverse curvature of the blade decreases from the inner end toward the outer end of the blade as does the angle of attack of the leading edge, as illustrated in Figures 5, 6 and 7, the decreasing angle of attack being illustrated by the angles A, B and C in the respective figures.

As more particularly shown in Figure 8, the blade 11 is of uniform thickness throughout the major part thereof. The leading edge 31 of the blade 11 is, however, shaped to an airfoil contour to reduce the resistance to the forward movement of the blade, and to provide for a smooth flow of air over the leading edge of the blade.

The trailing edge 32 of the blade, or that portion of the blade leading to the trailing edge, is reduced in thickness gradually from a point in advance of the trailing edge 32 toward the trailing edge as the air flows over this edge during operation of the fan. The thinning of the blade toward the trailing edge can be occasioned by removal of material from both faces of the blade, or from either face, in varying amounts.

The first step in the process of making the blades 11 of the ventilating fan consists in cutting blanks of the desired shape from flat sheets of "C-stage" thermosetting material. Preferably, this "C-stage" thermosetting material is a fabric-reinforced material. The cutting of the blanks can be done in any suitable way.

It has been found that if the "C-stage" thermosetting material is uniformly heated throughout its thickness to a temperature of from 250° F. to approximately 350° F., and placed under pressure, the material can be formed from the flat sheet into various configurations. However, the "C-stage" material deteriorates rapidly under heat and it has been found that if the material is either heated to a too high temperature or for too long a time, the material deteriorates as evidenced by blisters appearing on the surface of the sheet. It has been found, however, that when a sheet of "C-stage" thermosetting sheet material is heated in a liquid bath, such as an oil bath, that is maintained at a temperature of 350° F. for a time just short of the blistering time, the sheet material is in a sufficiently soft state that it can readily be formed into a variety of useful shapes, such as the fan blade of this invention.

The actual time factor for heating a sheet of "C-stage" thermosetting sheet material has been determined by retaining the material in an oil bath maintained at a temperature of 350° F. for a sufficient period of time to cause blistering of the surface of the material. The actual heating time for sheets that are to be formed is then reduced to approximately 80 to 90% of the blistering time of the sheet, preferably 80% of the blistering time. It has been found that the temperature of the sheet of material so heated will have been brought to approximately the temperature of the heating bath.

The length of time required to heat a "C-stage" thermosetting sheet of material of ⅝" thickness, of which the fan blades of this invention are formed, is approximately 10 minutes, which time is about 80% of the blistering time of the sheet when retained in an oil bath maintained at 350° F.

The heated sheet of "C-stage" thermosetting sheet material is then transferred immediately to between suitable dies and pressure of 30 lbs. per square inch is placed upon the dies to form the sheet to the contour of the dies. It has been found that with the sheet heated as previously described, a time lapse of about one minute can occur from the time the sheet is removed from the heating oil bath to the placement of pressure on the sheet in the dies. However, the customary practice is to effect the transfer in as short a time as possible to prevent any substantial reduction in the temperature of the heated blank.

The dies used in forming the heated sheet are relatively inexpensive, as it has been found that dies of hard wood are suitable for use in this process for the pressures and temperatures involved are not sufficient to cause any difficulty with such dies. In Figure 12 there is illustrated a male and a female die 40 and 41 for forming the fan blade 11, a heated sheet of material 42 having been placed between the dies.

With pressure of 30 lbs. per square inch applied to the dies, the dies are held in closed position until the temperature of the sheet of "C-stage" thermosetting sheet material reduces in temperature to below 100° F., preferably 90° F., whereupon the die can be opened and the formed sheet removed from the die. With the temperature reduced to that aforementioned, the article will not lose any of its formed shape.

Immediately upon removal of the formed sheet from between the dies, the formed sheet is given a cold water quench either by spraying with cold water or dipping the formed sheet into a cold water tank. Water below 70° F. is sufficiently cold to insure positive setting of the material.

Any necessary machine work can then be done upon the formed article, and in the case of the plates 11 of this invention, the leading edge 31 and the trailing edge 32 are formed by any suitable machinery, or if desired, could even be formed by hand.

The ventilating fan having plates constructed in accordance with the foregoing method is particularly adaptable for moving large volumes of air, such fans having blades as much as 10 to 15 feet long on a fan with an overall diameter of as much as 36 feet.

One of the principal troubles in fans having long blades is the development of flutter in the blade. This factor sets up air disturbance resulting in improper handling of the air by the fan, sets up vibration and noise, and in general decreases the fan efficiency.

However, a fan constructed according to this invention with blades formed from sheets of "C-stage" thermosetting sheet mtaerial results in one in which the blades are extremely flexible when the fan is stationary. However, when the fan is in motion, the blades become semi-rigid to the extent that they do not deviate from a fixed path of travel about the axis of rotation, even though the blades may flex rearwardly, relative to the direction of flow of air moved by the fan, to a substantial degree.

When ventilating fans of the type disclosed herein are mounted within an air duct 50, as shown in Figure 3, the hub wheel 10 of the fan is carried upon a drive shaft 51 that is supported by a spider structure 52 within the air duct 50.

As the fan rotates in the air duct 50 and the blades pass over the bars constituting the spider structure 52, there is a relief of pressure on the fan blades which permits them to rise slightly relative to the spider structure 52. In long fan blades of conventional type, this action sets up a flutter in the blades, which decreases the efficiency of operation of the fan, as heretofore mentioned.

However, fan blades made according to this invention do not flutter, but rather float in a uniform pattern of motion as the blades pass over the spider structure 52. This is believed to be brought about by the fact that the forming of the blades according to this invention relieves all forming stress in the blades, thus making it possible for them to absorb small vibrations, and damp them out before the vibrations are able to set up a synchronous vibrating pattern in the blade to produce the flutter.

The complete strain relief of the blade is further brought out by the fact that the blade completely loses notch consciousness, as has been demonstrated by placing notches in the leading edges of the blades and noting the failure of the notch to travel across the face of the blades during actual flexing conditions of operation hereinbefore described.

In Figure 11 there is illustrated a slightly modified construction of the fan blade in that in addition to the transverse curvature imparted to the blade, as illustrated in Figures 5, 6 and 7, a longitudinal curvature is given to the blade 50 to increase the rigidity of the blade. In shorter blades in the neighborhood of 6 feet to 10 feet, such longitudinal curvature is usually unnecessary, but as the blades increase in length, such longitudinal curvature does have advantage in preventing undue longitudinal flexing of the blade.

We claim:

In a large diameter ventilating fan having a fan blade of a length of about ten to fifteen feet and having a plurality of fan blades attached at their inner ends to a rotatable wheel, said wheel comprising a circular plate having a central hub section, rim segments curved to conform to said plate and attached thereto which are spaced circumferentially about the periphery of said plate, said spaced segments defining rimless portions constituting openings in the peripheral rim section for mounting a fan blade hub portion, radially spaced gusset members which extend from the hub section of the wheel to adjacent outer rim segments, reinforcing members extending diagonally between each of said gusset members and having their outer ends connected with a rim segment near its end, said rim segments, gussets and diagonally arranged members being welded to said circular plate to provide an integral reinforced wheel structure, a slot in said circular plate at said rimless open portion which extends inwardly from the periphery of said plate and adapted to receive the hub portion of a fan blade, said fan blade hub portion comprising elongated split sleeve members secured to the inner end of said fan blade and having integral semi-circular portions for clamping against the inner end portion of said fan blade, semi-circular members encompassing said blade hub portion and which members are attached to said cricular wheel plate for securing said blade thereto, said split sleeve members having an annular recess for receiving an annular shoulder means on said semi-circular member to prevent relative movement between the blade and its hub portion, said fan blade comprising a laminated molded resinous material which is curved along its longitudinal axis to prevent flexing of the blade about said axis and to provide a non-fluttering fan blade.

References Cited in the file of this patent
UNITED STATES PATENTS

| | | |
|---|---|---|
| 1,433,728 | Kemp | Oct. 31, 1922 |
| 1,430,561 | Kempton et al. | Oct. 3, 1922 |
| 1,638,695 | Leitner | Aug. 9, 1927 |
| 2,191,341 | Curley | Feb. 20, 1940 |
| 2,202,013 | Lougheed | May 28, 1940 |
| 2,232,670 | Barrett | Feb. 18, 1941 |
| 2,307,490 | Curley | Jan. 5, 1943 |